(12) United States Patent
Ono

(10) Patent No.: US 8,961,264 B2
(45) Date of Patent: Feb. 24, 2015

(54) METHOD OF DEBURRING A BALL

(75) Inventor: Takahisa Ono, Fujisawa (JP)

(73) Assignee: NIKE, Inc., Beaverton, OR (US)

( * ) Notice: Subject to any disclaimer, the term of this patent is extended or adjusted under 35 U.S.C. 154(b) by 804 days.

(21) Appl. No.: 12/968,038

(22) Filed: Dec. 14, 2010

(65) Prior Publication Data

US 2012/0149280 A1 Jun. 14, 2012

(51) Int. Cl.
| | | |
|---|---|---|
| *B24B 1/00* | (2006.01) | |
| *B24B 11/02* | (2006.01) | |
| *A63B 45/00* | (2006.01) | |
| *A63B 47/00* | (2006.01) | |
| *B29C 37/02* | (2006.01) | |
| *A63B 37/00* | (2006.01) | |
| *B29C 37/00* | (2006.01) | |

(52) U.S. Cl.
CPC .............. *B24B 11/02* (2013.01); *A63B 37/0003* (2013.01); *A63B 45/00* (2013.01); *A63B 47/00* (2013.01); *B29C 37/02* (2013.01); *B29C 2037/903* (2013.01)
USPC ................................................ 451/5; 451/49

(58) Field of Classification Search
USPC .................................................. 451/5, 11, 49
See application file for complete search history.

(56) References Cited

U.S. PATENT DOCUMENTS

| | | |
|---|---|---|
| 3,561,908 A | 2/1971 | Reinfeld |
| 4,221,514 A | 9/1980 | Pavlovsky |
| 4,667,444 A | 5/1987 | Langlois et al. |
| 4,779,387 A | 10/1988 | Reid et al. |
| 4,894,958 A | 1/1990 | Takasaki |
| 4,979,283 A | 12/1990 | Kurita et al. |
| 5,348,462 A | 9/1994 | Cohen et al. |
| 5,472,330 A | 12/1995 | Oka et al. |
| 5,494,631 A | 2/1996 | Oka et al. |
| 5,554,337 A | 9/1996 | Ihara |
| 5,611,723 A | 3/1997 | Mitoma et al. |
| 5,658,188 A | 8/1997 | Yamada et al. |
| 6,126,522 A | 10/2000 | Endo et al. |
| 6,129,611 A | 10/2000 | Yamaguchi |
| 6,165,049 A * | 12/2000 | Yamaguchi ...................... 451/6 |
| 6,168,407 B1 | 1/2001 | Kasashima et al. |
| 6,248,974 B1 | 6/2001 | Wai |
| 6,597,445 B2 | 7/2003 | Sugimoto |
| 7,273,574 B2 | 9/2007 | Yamakawa et al. |
| 7,530,906 B2 | 5/2009 | Ono |
| 8,469,773 B2 | 6/2013 | Ono |

FOREIGN PATENT DOCUMENTS

| | | |
|---|---|---|
| AU | 2011253902 | 9/2013 |
| CA | 2760596 | 11/2012 |

(Continued)

OTHER PUBLICATIONS

Office Action in Korean Patent Application No. 10-2011-0133797, mailed on Jun. 7, 2012.

(Continued)

*Primary Examiner* — Maurina Rachuba
(74) *Attorney, Agent, or Firm* — Plumsea Law Group, LLC

(57) ABSTRACT

A controller controls the position of an abrasive. The abrasive is moved to a first desired position adjacent a ball. The ball is rotated while in contact with the abrasive. The abrasive abrades the outer surface of the ball and burrs on the outer surface to remove the burrs. A sensor may be used to sense the position and size of the burrs.

20 Claims, 7 Drawing Sheets

(56) References Cited

FOREIGN PATENT DOCUMENTS

| | | |
|---|---|---|
| CA | 2761214 | 11/2012 |
| CN | ZL201120520595.5 | 11/2012 |
| GB | 2298155 | 8/1996 |
| JP | 49126439 | 12/1974 |
| JP | 52021063 | 2/1977 |
| JP | H06170015 A | 6/1994 |
| JP | 8229810 | 9/1996 |
| JP | 9155744 | 6/1997 |
| JP | 10179808 | 7/1998 |
| JP | H11333027 | 12/1999 |
| JP | 2000014831 | 1/2000 |
| JP | 2004215962 | 8/2004 |
| KR | 20080088482 | 10/2008 |
| KR | 1215814 | 12/2012 |
| KR | 1219863 | 1/2013 |

OTHER PUBLICATIONS

Extended European Search Report and Written Opinion in European Patent Application No. EP11193545.8, mailed on Mar. 20, 2012.
Certified English-language Translation of Korean Prior Art Search Report in Korean Application No. 10-2011-0133797 dated Dec. 28, 2011.
Patent Examination Report in Australian Patent Application No. 2011235747, issued on Dec. 4, 2012.
Communication pursuant to Rules 70(2) & 70a(2) EPC & reference to Rule 39(1) EPC issued Jun. 25, 2012 for European Patent Application No. 11193554.0.
Response to Communication pursuant to Rules 70(2) & 70a(2) EPC & reference to Rule 39(1) EPC filed Dec. 20, 2012 for European Patent Application No. 11 193 554.0.
Office Action mailed on May 3, 2012 for U.S. Appl. No. 12/968,033.
Office Action mailed on Oct. 18, 2012 for U.S. Appl. No. 12/968,033.
Certified English-language Translation of Korean Prior Art Search Report in Korean Application No. 10-2011-0133820 dated Dec. 28, 2011.
Communication pursuant to Rules 70(2) & 70a(2) EPC & reference to Rule 39(1) EPC issued Jun. 25, 2012 for European Patent Application No. 11193545.8.
Response to Communication pursuant to Rules 70(2) & 70a(2) EPC & reference to Rule 39(1) EPC filed Dec. 18, 2012 for European Patent Application No. 11193545.8.
European Search Report in European Patent Application No. 11193554.0, mailed on Mar. 20, 2012.
Notice of Allowance issued Mar. 14, 2012 for Canadian Patent Application No. 2761214.
Notice of Decision for Patent mailed Oct. 4, 2012 for Korean Patent Application No. 10-2011-0133797.
Notice of Grant of Patent Right for Utility Model in Chinese Utility Model Patent Application No. 201120520595.5 mailed on Jul. 26, 2012.
Patent Examination Report No. 1 in Australian Patent Application No. 2011253902, mailed on Nov. 29, 2012.
Notice of Allowance in Canadian Patent Application No. 2760596, mailed on Feb. 29, 2012.
Notice of Allowance in Korean Patent Application No. 10-2011-0133820, mailed on Oct. 8, 2012.
Notice of Allowance mailed on Mar. 25, 2013 for U.S. Appl. No. 12/968,033.
English Translation of Notice of Allowance for Taiwanese Patent Application No. 100145259, dated Jun. 6, 2014.
English Translation of Second Office Action for Chinese Patent Application No. 201110417543.X, dated Jul. 15, 2014.
Communication under Rule 71(3) for European Patent Application No. 11193545.8, dated Jul. 8, 2014.
English Tranlsation of Office Action in Taiwanese Patent Application No. 100144633, dated Feb. 27, 2014.
English Translation of Office Action in Taiwanese Patent Application No. 100145259, dated Feb. 27, 2014.
English Translation of Office Action in Chinese Patent Application No. 20110417543.X dated Nov. 29, 2013.
English Translation of Office Action in Japanese Patent Application No. 2011-271281, dated Nov. 19, 2013.
English Translation of Office Action in Chinese Patent Application No. 201110415857.6, dated Nov. 5, 2013.
English Translation of Office Action in Japanese Patent Application No. 2011-271280, dated Oct. 8, 2013.
English Translation of Office Action mailed Sep. 30, 2014 for Japanese Application No. 2011-271281.

* cited by examiner

METHOD OF DEBURRING A BALL

FIELD

The present disclosure relates generally to a method for deburring a golf ball. More specifically, the present disclosure relates to a method for deburring a ball where a controller moves an abrasive to one or more desired positions over a ball and rotates the ball to abrade the surface and remove the burr or burrs.

BACKGROUND

Many golf balls are made of multiple layers. Many of these golf balls are manufactured using an injection molding technique. While much of the interior surface of a typical golf ball mold is smooth, various surface discontinuities exist in common molding techniques.

In many instances, golf balls are molded using an injection mold. When an injection mold is used, various features are common. First, there is typically an opening for an injection nozzle to be inserted into the mold cavity. Next, there are frequently one or more vent holes to vent air when the mold is being filled with resin or other material. Finally, there may be holes for pins that are inserted to stabilize an intermediate layer while it is surrounded with another material. Each of these openings in the mold creates a discontinuity. Each discontinuous area may create a discontinuity on the molded ball.

Discontinuities on the ball are generally undesirable. The aerodynamic properties of the ball are typically important to a golfer. Any area of discontinuity may tend to alter the aerodynamic properties of the ball and create an unsatisfactory flight path. Accordingly, there have been systems and structures used to deburr the balls after molding.

In some prior systems, the molded ball, possibly along with other balls, has been placed into a bin and surrounded by abrasive articles, such as sandpaper, pumice, or the like. The bin is then agitated and the ball is removed. In such a system, there is an inability to precisely control the degree of abrasion on the ball, and the ball's surface may be inconsistently abraded, creating a different discontinuity.

In other prior systems, the ball may be placed within a grinder and rotated or agitated while an abrasive surface evenly abrades the entirety of the ball surface. Such a system also abrades the surface of the ball where no abrasion needs to be applied. Accordingly, while such a system may remove the burrs, it also tends to damage other areas of the ball's surface.

Other systems have controlled a head that moves across the surface of a ball in a rotary or linear fashion. Some of these systems have attempted to control the level of abrasion by measuring the pressure between the ball and the abrasive in order to determine whether the burr has been completely removed. However, measuring the pressure may be inexact and requires the removal of some of the outermost cover of the ball before the pressure increase is measured.

What may be desirable instead is a method that removes burrs from particular locations on a ball while minimizing damage to the surface of the ball. Specifically, it may be desirable to incorporate a method that calculates a desired position of an abrasive head and positions the head in the desired position adjacent a burr. The ball may then be rotated to abrade the surface and remove the burr.

SUMMARY

In one embodiment, a method of deburring a ball is disclosed. A first abrasive is provided. The head is made from a material capable of abrading a burr and removing it from an outer surface of a ball. The first abrasive is connected to an adjustment structure capable of controlling the relative position of the first abrasive and the ball. An appropriate position of the first abrasive is calculated. The first abrasive is moved to the appropriate position.

In one embodiment, a ball holder may also be provided. An appropriate length of time for the ball holder to rotate may be calculated. A ball having burrs may be placed in the ball holder.

In another embodiment, a method of deburring a ball is disclosed. A first abrasive surface is provided. A programmable logic circuit is provided that is capable of calculating a first desired position of the first abrasive surface. An attachment structure is connected to the programmable logic circuit and the first abrasive surface. The adjustment structure is capable of moving the first abrasive surface into a first desired position. The first desired position is calculated. The first abrasive head is moved into the first desired position.

A rotatable ball holder may also be connected to the programmable logic circuit. The programmable logic circuit may also calculate a desired length and speed of rotation of the rotatable ball holder. The ball holder may be rotated at the desired speed for the desired length of time.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The present embodiments relate to structures used to deburr golf balls. The necessity of deburring golf balls is due to the methods typically used to mold golf balls. Frequently, golf balls are made with an injection molding process. The injection molding process typically uses a mold that includes various discontinuities. Each discontinuity may cause a burr to be created on an external surface of the ball.

Figure 1:
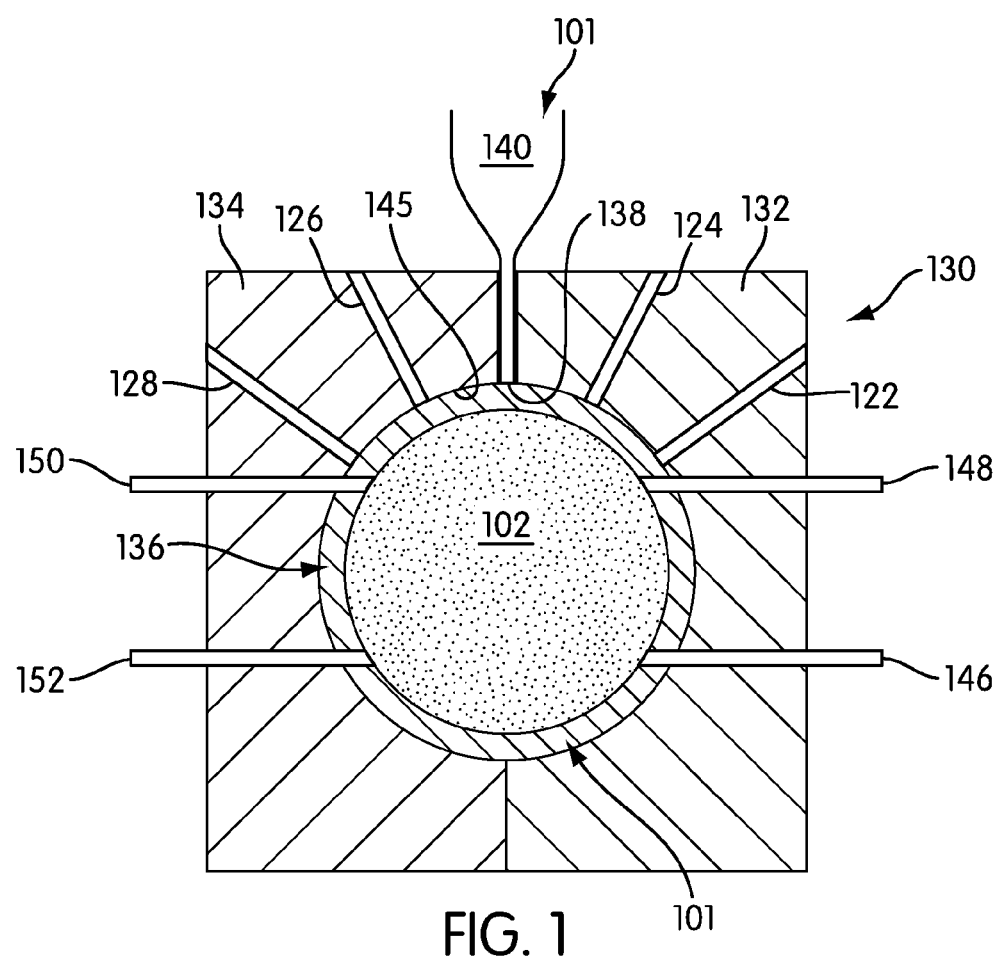
FIG. 1 is cross sectional view of a ball being molded in one embodiment of an injection mold.

FIG. 1 shows a molding step that represents the application of a final layer on a golf ball. The final molding step may be the addition of a cover layer, a top coat, or whatever final molding step a designer may deem desirable. The remaining layers of the ball internal to the final molded layer may collectively be called the interior layers and are numbered 102. In some embodiments, layer 102 is a single layer or core. In other embodiments, layer 102 may include a core, a medial layer, a mantle layer, other intermediate layers or inserts, either alone or in combination with one another. In some embodiments, an interior layer of a ball may be deburred before application of a further layer. Accordingly, while the outermost layer is described here, it will be appreciated by a person having ordinary skill in the art that any layer of a ball may be deburred with the presently disclosed methods.

FIG. 1 shows the use of mold 130 to form the outermost layer. Mold 130 may be one of a variety of types of molds, depending on the material to be molded therein. In FIG. 1, mold 130 is shown as a standard injection mold. Mold 130 may include first mold portion 132 and second mold portion 134. First mold portion 132 and second mold portion 134 can be separated from one another to place items in mold 130 before molding occurs or to remove the formed material after molding. First mold portion 132 and second mold portion 134 form mold cavity 136 therein. Injection port 138 may be present, for example, at the top of mold cavity 136. Injection port 138 may be in fluid communication with reservoir 140 that contains material 101. In some embodiments, material 101 may be a thermoplastic urethane, such as SURLYN. Material 101 is introduced into mold cavity 136 from reservoir 140 via injection port 138.

As material 101 is injected into mold cavity 136, air must be evacuated from mold cavity 136. Accordingly, vent holes may be incorporated into mold 130 to allow the air to evacuate. In the embodiment shown in FIG. 1, four vent holes are shown. Specifically, first vent hole 122, second vent hole 124, third vent hole 126, and fourth vent hole 128 are shown as extending at various locations between mold cavity 136 and the exterior of mold 130. The position and number of vent holes is exemplary and may be modified as desired by a person having ordinary skill in the art.

As shown in FIG. 1, one option for properly positioning interior layers 102 in mold cavity 136 is to support interior layers 102 with a plurality of pins. FIG. 1 shows the use of first pin 146, second pin 148, third pin 150, and fourth pin 152. First pin 146, second pin 148, third pin 150, and fourth pin 152 are designed to be retractable within mold cavity 136. As material 101 is injected into mold cavity 136, it fills mold cavity 136. As it begins to harden, it becomes capable of supporting interior layers 102 within mold cavity 136. As material 101 begins to harden, first pin 146 and fourth pin 152 can be retracted. As material 101 begins to further fill mold cavity 136, second pin 148 and third pin 150 can be retracted. This retraction after the partial hardening of material 101 allows interior layers 102 to remain centered within mold cavity 136 and for material 101 to evenly fill mold cavity 136. While not specifically shown and described, a similar method could be used to mold ball interior layers 102.

While four pins 146, 148, 150, 152 are shown, and while they are shown protruding only from the sides of mold cavity 136, these features should not be seen as being limiting. In some embodiments, it may be desirable to place more or fewer pins in mold cavity 136. In other embodiments, it may be desirable to space the pins more evenly throughout mold cavity 136. Finally, it may be desirable to include pins on the top or bottom sides of mold cavity 136. A person having ordinary skill in the art will be able to modify the mold design to provide an appropriate molding environment based on the materials selected and the design characteristics desired.

In FIG. 1, the pins are shown as still being in contact with inner layers 102, rather than having been retracted to be substantially flush with inner wall 145 of mold cavity 136. The pins are so positioned in FIG. 1 to aid understanding of their extended position. In a commercial embodiment, when the material 101 had completely filled mold cavity 136 to this extent, it is likely that the pins would have been partially or fully retracted in order to allow the complete filling of cavity 136 with material 101.

Mold 130 may also be heated or at room temperature, depending on the material to be injected to form the outermost layer. If mold 130 is heated, mold 130 may be allowed to cool. After mold 130 reaches room temperature or after the layers have been allowed to cure for an appropriate amount of time, the formed ball may be removed from mold 130, such as by separating first mold portion 132 from second mold portion 134.

The configuration of mold interior wall 145 may be designed to mold the outer surface of the ball. Accordingly, interior wall 145 may be patterned to allow for dimples and lands and other desirable markings to be molded into the cover of the ball. The precise configuration of the outer ball surface will depend on the desired ball characteristics. A person having ordinary skill in the art will be able to easily design interior wall 145 with desired characteristics in accordance with the ball's desired characteristics without undue experimentation. The pattern of dimples on the outside of the ball may be designed independently of the characteristics for the inner layers of the ball. In the present disclosure, the dimple pattern selected does not significantly affect the structures disclosed. Accordingly, interior wall 145 in the FIGS. is shown as being smooth, rather than showing the details of a pattern.

Figure 2:
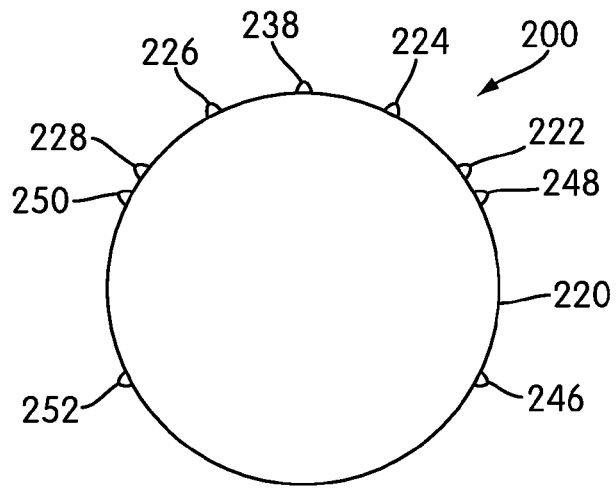
FIG. 2 is simplified side view of a ball manufactured using the mold of FIG. 1.

FIG. 2 shows an exemplary ball 200 that is made with the process shown in FIG. 1. FIG. 2 shows the existence of nine burrs on the outer surface 220 of ball 200. Outer surface 220 in many of the FIGS. is shown in simplified form as being a smooth surface. In a commercial embodiment, ball 200 would include various dimples and lands surrounding the dimples. The precise dimple pattern is not critical to the functioning of the present embodiments, so the dimple pattern has been eliminated from many of the FIGS. to improve understanding of the embodiments described herein.

Each of the nine burrs shown in FIG. 2 corresponds generally in position to an element in mold 130 as shown and described in FIG. 1. First burr 246, second burr 248, third burr 250, and fourth burr 252 correspond in position to the position of first pin 146, second pin 148, third pin 150, and fourth pin 152, respectively. Due to basic tolerance stack, differences in the shape of inner layers 102 and mold cavity wall 145, and other considerations, for each position where the respective pin meets mold cavity wall 145 (see FIG. 1), a corresponding burr is likely to form on outer surface 220 of ball 200.

Fifth burr 222, sixth burr 224, seventh burr 226, and eighth burr 228 correspond in position to the position of first vent hole 122, second vent hole 124, third vent hole 126, and fourth vent hole 128, respectively. The vent holes are provided as openings to allow air to escape mold cavity 136. However, the vent holes are also likely to allow some degree of intrusion of material 101 into each vent hole during the molding process. This intrusion and other factors make a burr likely to form on outer surface 220 of ball 200 where it is adjacent each vent hole.

Ninth burr 238 corresponds in position to the position of injection nozzle or port 138. Because of the discontinuity of inner mold wall 145 in the area of nozzle 138, and possibly due to the properties of material 101 that may not fully separate from nozzle 138, ninth burr 238 is likely to form on outer surface 220 of ball 200 in this area.

The positioning of the various mold elements and the corresponding burrs has been simplified in the FIGS. and in the description. In a commercial embodiment, it is unnecessary and may be undesirable for all the pins, vent holes, and injection ports to align along a single plane in mold 130. A person having ordinary skill in the art is likely to design a mold where the pins, vent holes, and port are spaced from one another around mold 130. However, regardless of the specific position of each of these elements, a burr is likely to form in each area of discontinuity in a mold. Other elements in the mold may also create areas of discontinuity but have not been illustrated. The illustration of these elements and the corresponding burrs aligned on a single plane is merely for ease of illustration and understanding and the present embodiments should not be considered as being limited to situations where the burrs are so aligned.

Figure 3:
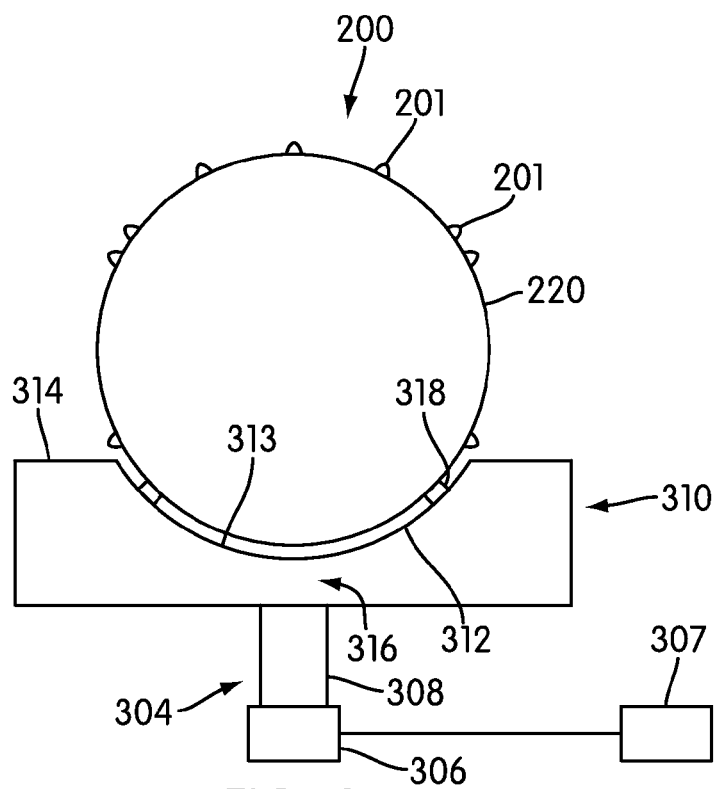
FIG. 3 is a side view of the ball of FIG. 2 inserted into a ball holder.
Figure 4:
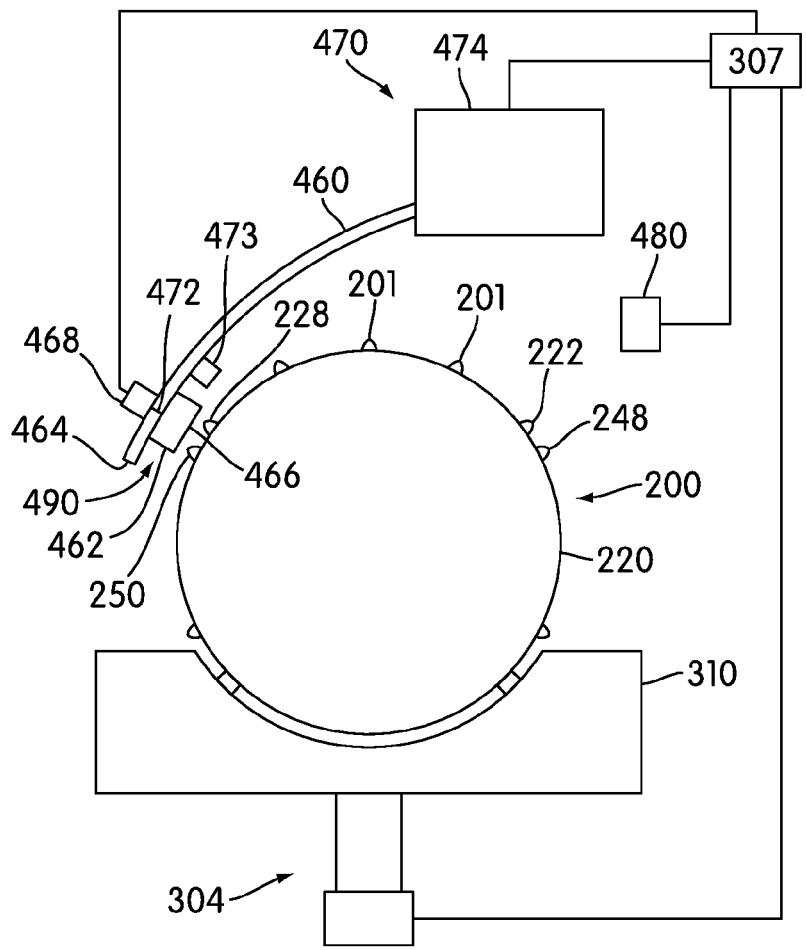
FIG. 4 is a side view of one embodiment of a simplified structure that may be used in a method of deburring a ball.

Turning now to FIGS. 3 and 4, one example of a detailed structure that can be used in connection with the present embodiments is disclosed in U.S. Pat. No. 8,469,773, currently U.S. patent application Ser. No. 12/968,033, filed concurrently herewith and entitled "Golf Ball Deburring Apparatus", which application is incorporated herein in its entirety by reference.

However, the structure disclosed therein need not be used. The structure therein disclosed includes various cams and hydraulic structures. In the presently disclosed embodiments of methods, such cams and hydraulic structures could be used. Alternatively, electric motors or other structures could be used to move and position the various elements while using the same method disclosed herein.

FIG. 3 illustrates ball 200 placed or positioned in ball holder 310. Ball holder 310 may be any sort of holder that is capable of locating a ball in a particular position. Ball holder 310 desirably defines a recess 312 in a first surface 314. Recess 312 may be designed to correspond generally in shape and size to any ball 200 that may be placed therein. According to USGA rules, a ball that conforms to the rules may not be smaller than 1.68 inches in diameter according to current rules and should be spherical and spherically symmetrical. Depending on the position of the burrs on balls created with a particular molding structure and method, a person having ordinary skill in the art can determine the diameter and depth of recess 312 necessary to accommodate ball 200 molded with the desired molding structure and method. If balls of varying diameters are to be used in connection with the presently described embodiments, either ball holders specifically designed for each diameter of ball may be selected or the central area 316 of ball holder 310 may be modified to allow provide for an adjustment structure to allow cavity 312 to have varying diameters. Recess 312 may be designed to have a surface 313 close to outer surface 220 of ball 200 as shown in FIG. 3, but surface 313 of cavity 312 need not be close to outer surface 220 of ball 200 if it does not support ball 200.

Ball grip 318 may be included in recess 312. Ball grip 318 may be any of a variety of materials that serve to prevent ball 200 from moving relative to ball holder 310, particularly when pressure is applied to ball 200, as will be described in greater detail below. In many embodiments, grip 318 may be a rubberized strip that has adequate tack to tend to minimize slip, such as a rubberized material common to non-skid shoe soles. In other instances, grip 318 could be an adhesive adequate to retain ball 200 in recess 312 while allowing ball 200 to be removed after the deburring process has been completed. In another embodiment, grip 318 could be a mechanical clamp that mates with ball 200 to prevent movement. In many embodiments, the only contact between ball 200 and holder 310 may be through grip 318.

In some embodiments, it may be desirable to position ball 200 in a specific orientation. In the embodiment shown in FIG. 2, for example, ninth burr 238 may be considered to be a single burr about which the other burrs are mirrored. That is, for example, sixth burr 224 and seventh burr 226 are approximately the same distance from ninth burr 238. In such an example, it may be desirable to orient ball 200 so that ninth burr 238 is positioned directly opposite holder surface 313. In such an instance, a sensor (not shown) may be provided to guide the placement of ball 200 in holder 310 in such a position. In other embodiments, such as when a user manually places ball 200 in holder 310, a guide (not shown), such as a laser beam may be positioned to shine onto the place where ninth burr 238 should be positioned when it is directly up. Such a placement aid is desirable, but may not be used in some embodiments.

In some embodiments, it may be desirable that ball holder 310 rotate. Accordingly, rotator 304 may be incorporated as a part of ball holder 310. Rotator 304 may be any of a variety of structures capable of rotating ball holder surface 314. In many embodiments, rotator 304 includes motor 306 and shaft 308. Motor 306 may desirably be a standard AC electric motor. Shaft 308 may be connected directly or through a transmission to the output shaft of motor 306 and may be connected directly or through a transmission to ball holder surface 314. Other configurations may also be used. In its simplest form, rotator 304 may be a simple hand crank with an output shaft connected to ball holder surface 314. In other embodiments, an engine, DC motor or other direct or indirect drive system may be used instead of the AC electric motor.

In the method disclosed herein, the rotation of ball holder 310 may be controlled by an electric controller 307. In some embodiments, electric controller 307 may be a programmable logic circuit. Electric controller 307 may have various characteristics. Controller 307 may be configured to include a capacity to calculate a desired or appropriate length of time and a desired speed for ball holder surface 314 and ball 200 to rotate. The desired speed and length of time may be related to, for example, the material from which burrs 201 are formed, the speed limitations of rotator 304, the amount of the ball positioned within cavity 312, and the like. In the present disclosure, the numeral 201 and the phrases burr 201 or burrs 201 are used when describing any burr positioned on ball 200, rather than the specific burrs with specific placements described in FIG. 2 above. In some embodiments, what may be important is the number of rotations made by holder 310 and ball 200. In such an instance, the speed and length of time of rotation may be varied within the capabilities of the rotator 304 in order to produce the desired number of rotations. Calculation of a number of rotations may be equivalent to calculation of a speed and time of rotation. Factors relating to other elements of the method and structure, as will be described in greater detail below, may also be incorporated into the calculation of the speed and length of time for the ball holder to rotate.

In some embodiments, it may be desirable for rotator 304 to be configured to be able to receive signals from and be directed by electrical controller 307. Electrical controller 307 may be able to remotely control, for example, whether motor 306 is on or off and the speed at which shaft 308 and ball holder surface 314 rotate. If a transmission is used at either end of shaft 308, electrical controller 307 may also govern the gear reduction used, if multiple gears are possible. In this manner, controller 307 may control the rotation of rotator 304 and ball 200.

Turning now to FIG. 4, an overall configuration of various elements that may be used in deburring ball 200 is shown. As noted earlier, the overall configuration of the structural elements may vary depending on the characteristics deemed most feasible or desirable by a designer. In some embodiments, some or all of the parts may be controlled through a hydraulic system. In other embodiments, some or all of the parts may be controlled through electric motors. In other embodiments, some or all of the parts may be controlled by mechanical camming. In still other embodiments, a user may individually locate a particular part, such as an abrasive head, by hand. However, in many embodiments, it may be desirable that the parts be controllable by electric controller 307.

Electric controller 307 may be electrically connected to various elements. This electrical connection may take the form of a wired or wireless connection, depending on the desires of the designer. In some embodiments, such as, for example, if the position of a part is controlled by an electric motor or other electrically controlled positioning apparatus, the electrical connection is formed through a standard wiring system may control the motor to properly position or move a desired part. In other embodiments, the same connection may take place through the use of wireless transmitters, receivers, or transceivers connected to each of electric controller 307 and the part desired to be controlled or moved. In other embodiments, controller 307 may instead generate data indicating the desired position or other data relating to the control of the system and a user may use those data to properly position or move the various parts of the system. Any of these alternatives, along with other alternatives for moving the elements, may all be considered equivalent to connecting controller 307, directly or indirectly, to the element to be moved or positioned.

FIG. 4 shows a simplified view of various elements that may be used in connection with the methods disclosed herein. FIG. 4 shows the use of arm 460 and abrasive 462.

Abrasive 462 is connected to arm 460. Abrasive 462 is shown in simplified form in FIG. 4. Abrasive 462 is shown in FIG. 4 as being positioned near free end 464 of arm 460. However, abrasive 462 need not be so positioned. Abrasive 462 may be positioned at any desirable position along arm 460, as will be seen in later FIGS. Arm 460 may not, in some embodiments, include a free end, but instead may extend in a closed curve around ball 200. Abrasive 462 includes abrasive surface 466. Abrasive surface 466 is desirably positioned adjacent any burr 201. Abrasive surface 466 may be made from a variety of materials, but may be selected in cooperation with the material from which one or more burrs 201 on ball 200 are formed. For example, the desirable hardness of abrasive surface 466 may differ depending on the material forming the burr. Abrasive surface 466 may be thin, such as if abrasive surface 466 is formed of sandpaper over a support. Alternatively, abrasive 462 and abrasive surface 466 may be formed of a single piece of material, such as if a piece of pumice, for example, were to be used as abrasive surface 466. In some embodiments, a sensor 473 may be incorporated into or adjacent abrasive 462 to monitor the deterioration of abrasive surface 466 to determine when replacement of abrasive 462 is desirable. Abrasive surface 466 may be considered an abrasive head.

Abrasive 462 may be positioned adjacent ball 200 by adjusting its position with adjustment structure 470. Adjustment structure 470 may take a variety of forms. In the embodiment shown in FIG. 4, adjustment structure 470 includes arm 460 connected to abrasive 462. Arm 460 may take a variety of forms. In the embodiment shown in FIG. 4, arm 460 may take the form of a curved arm. In some embodiments, arm 460 may be continuous and round and have a radius at least slightly larger than that of ball 200. In other embodiments, arm 460 may be straight or bent. The precise configuration of arm 460 is not critical and may take the form the designer wishes.

Abrasive 462 may be connected to arm 460 in a fixed or movable configuration. Abrasive mover 468 may form a part of adjustment structure 470 and may be connected to abrasive 462 by connector 472 and may also be connected to controller 307. Controller 307 is capable of and does calculate the appropriate position of abrasive 462 on arm 460. Controller 307 may then transmit instructions to abrasive mover 468. Abrasive mover 468 may be capable of receiving the instructions from controller 307 and positioning abrasive 462 in a variety of manners. For example, in one embodiment, abrasive mover 468 may include a pump and hydraulics or other structure that moves abrasive 462 towards and away from arm 460 and ball 200. In another exemplary embodiment, abrasive mover 468 may include a rotator that is capable of changing the angular position of abrasive 462 relative to ball 200 and arm 460. In another exemplary embodiment, abrasive mover 468 may include a motor and gearing structure that is capable of moving abrasive along arm 460 and relative to ball 200. These are examples only of ways in which controller 307 may be able to move abrasive 462 relative to arm 460 or another fixture to which abrasive 462 may be connected.

As noted, in many embodiments, it may be desirable to include a movable arm 460 that positions abrasive 462 relative to ball 200. Movable arm 460 may be positioned by arm positioner 474. Arm positioner 474 may be connected to and controlled by controller 307. Arm positioner 474 may include various elements that are capable of controlling, for example, the effective length of arm 460, the arc of arm 460 over ball 200, and the pressure applied by arm 460 onto abrasive 462 and to ball 200. Arm positioner 474 may include various structures that may control these features of arm 460. For example, in one embodiment, arm positioner 474 may include a pump and hydraulics or other structure that changes the effective length or arc of arm 460 over ball 200. In another exemplary embodiment, arm positioner 474 may include a rotator that is capable of changing the angular position of arm 460 relative to ball 200. In another exemplary embodiment, arm positioner 474 may include a motor and gearing structure that is capable of moving arm 460 relative to ball 200. These are examples only of ways in which controller 307 may be able to move arm 460.

Adjustment structure 470 is the structure that is capable of controlling the relative position of ball 200 and abrasive surface 466. Adjustment structure 470 may, therefore, include arm positioner 474, arm 460, and abrasive mover 468. These parts may be connected to one another directly or indirectly. In some embodiments, one or more of the parts may be absent. In some embodiments, the moving and positioning of arm positioner 474 and abrasive mover 468 may be done manually by a user reading an output or other instructions from controller 307, rather than requiring an electrical connection between controller 307 and each of positioner 474 and mover 468.

In some embodiments, controller 307 is connected to sensor 480. Sensor 480 may be positioned adjacent ball holder 310 in the general location where ball 200 is positioned. Sensor 480 may be any type of sensor that is capable of detecting the positions of burrs 201 on ball 200. In many embodiments, the positions of burrs 201 on ball 200 are known, as was noted above. However, in the event that ball 200 is mispositioned on holder 310, sensor 480 can detect the mispositioning and alert a user of the mispositioning. Sensor 480 may also detect if one or more burrs 201 is absent or larger than typical size. Based on the data received from sensor 480, controller 307 can make the desired calculations.

The method to deburr ball 200 takes into account all these structures. First, ball 200 having burrs 201 is placed in ball holder 310. Controller 307 optionally may actuate sensor 480 to determine the position of burrs 201 on ball 200. Alternatively, controller 307 may use data from a known profile of balls and burrs. Controller 307 may then consider data relating to the deburring structure itself. For example, controller 307 may consider the speed at which rotator 304 may rotate, the limitations of abrasive mover 468, arm 460, arm positioner 474, and other elements of adjustment structure 470. Controller may also consider data relating to the material from which abrasive 462 is made, the age and wear on abrasive 462, including data from sensor 473, the material from which ball 200 and burrs 201 are made, and any other data that are relevant to consider in making the calculations for properly deburring ball 200.

Once controller 307 has considered the data available, controller 307 makes the calculations that are necessary to deburr ball 200. Controller 307 will first calculate a first appropriate or desired position for abrasive 462 and shown generally at 490. A first appropriate or desired position may be as shown in FIG. 4, adjacent third burr 250 and eighth burr 228 (see also FIG. 2).

The calculation of first desired position 490 may include various elements. The calculation may include calculating an appropriate effective length of arm 460. An appropriate arc of arm 460 may also be calculated. Because abrasive 462 deteriorates over time with its use as an abrasive, and therefore may vary in length, for example, the calculation of the first desired position may further include a calculation of the position of first abrasive surface 466.

Controller 307 then determines one or more sets of movements of adjustment structure 470 to move abrasive 462 to first desired position 490. Controller actuates the desired elements in adjustment structure 470 to move abrasive 462 to first desired position 490. For example, controller 307 could actuate an electric motor in arm positioner 474 to move arm 460 to position abrasive 462 near first desired position 490. The actuation of an electric motor in arm positioner 474 may sequentially or simultaneously position the arm to have the appropriate effective length and an appropriate arc over ball 200. Then controller 307 could actuate a hydraulic system in abrasive mover 468 to extend abrasive 462 towards third burr 250 and eight burr 228. This actuation may be determined by the refined calculation of the appropriate position of first abrasive surface 466. Alternatively, controller 307 could actuate a system in abrasive mover 468 first and a system in arm positioner 474 second. As a further alternative, both systems could be actuated substantially simultaneously.

If desired, sensor 480 may then be actuated to confirm the appropriate placement of abrasive 462 in first appropriate position 490. If abrasive 462 is mispositioned, controller 307 may perform corrective calculations for first desired position 490 or may alternatively generate a fault signal.

The deburring of ball 200 occurs due to the abrasion of abrasive 462 against burrs 201 and outer surface 220 of ball 200. The abrasion occurs when ball 200 is rotated by rotatable ball holder 310 while abrasive 462 is held stationary and is pressed against burrs 201 and outer surface 220 of ball 200. Controller 307 calculates an appropriate or desired speed of rotation and an appropriate or desired time of rotation and/or an appropriate or desired number of rotations desireable to deburr ball 200. It is noted that when ball 200 is rotated, abrasive 462 in first position 490 may be effective to abrade and remove second burr 248 and fifth burr 222 in the same pass as third burr 250 and eighth burr 228.

Data from sensor 480 may be useful in this calculation. Because burrs 201 are typically left on ball 200 outer surface 220 due to irregularities in the mold, there is some degree of variation of size and shape of burrs 201 on outer surface 220. Sensor 480 may sense the size and shape of any burr 201 left on ball 200 in order to further refine the calculation from a standard calculation made with a median size burr.

After all the calculations have been made by controller 307 and abrasive 462 has been moved to first appropriate position 490, ball holder 310 is rotated by rotator 304, in many embodiments through an actuation of rotator 304 by controller 307. Abrasive 462 abrades each burr 201 and the outer surface 220 of ball 200 as long as it is in contact with ball 200 and ball 200 is rotating. After ball 200 has been spun an appropriate or desired length of time or an appropriate or desired number of rotations as calculated by controller 307, ball holder 310 ceases rotating. In an exemplary embodiment, the ball holder 310 may cease rotating due to an electric signal sent from controller 307 to rotator 304, which is electrically connected to controller 307.

Figure 5:
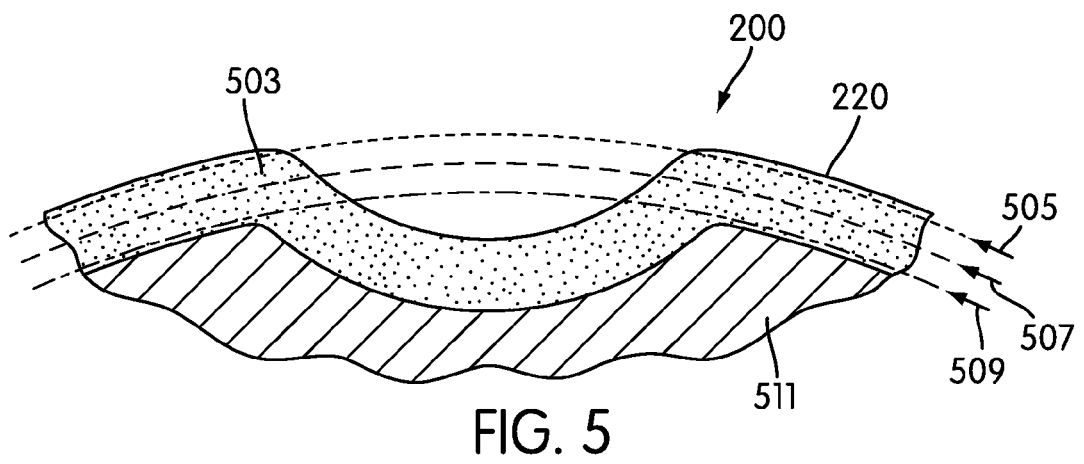
FIG. 5 is a detailed cross sectional view showing sample abrasion depths after designated periods of time.

FIG. 5 is a cross-sectional view showing the top two layers of ball 200 and illustrating the level of abrasion that may take place at different rotation times. The top two layers of a ball may be the cover and an intermediate layer, a top coat and a cover, a cover and a mantle layer, or any other configuration that may be desirable. While burrs may be most troublesome on the outermost layer that would be used by a player in a golf game, burrs on other layers may also be removed using the process disclosed herein when a designer believes it to be desirable. Controller 307 is capable of calculating the appropriate placement or position of abrasive 462 on any burr and the appropriate length, speed, or number of rotations of the ball holder regardless of the precise material used or the layer of a ball that is to be deburred.

When an abrasive (not shown in this FIG.) is placed against ball 200, it will abrade the surface 220 and any burr that is present. The abrasion will continue and will wear or grind away a portion of top layer 503. The amount of material taken away from top layer 503 depends on the time the ball holder (not shown in this FIG.) is rotated and ball 200 is in contact with the abrasive. After a first period of time, top layer 503 has worn away slightly and the outer surface reaches the line designated as 505. After a longer time, top layer 503 has worn away to a greater degree and the outer surface reaches the line designated as 507. After an even longer time, top layer 503 has worn away even further and the outer surface reaches the line designated as 509. In many embodiments, it may be undesirable for the abrasion of top layer 503 to continue after the time where the abrasion reaches line 509. This is because after the time designated by line 509, top layer 503 may become completely abraded away and next interior layer 511 may be exposed. Exposure of next interior layer 511 may be undesirable in many embodiments, particularly where next interior layer 511 is of a different material or color, as exposure of next interior layer 511 would then negatively affect the appearance, aerodynamics, or other performance qualities of ball 200. Because the thickness of top layer 503 has certain tolerances, it may be desirable to input data relating to this thickness and tolerance into controller 307. In many embodiments, it may be more advantageous to permit a very slight burr to remain on ball 200 instead of abrading top layer 503 through to next interior layer 511.

Figure 6:
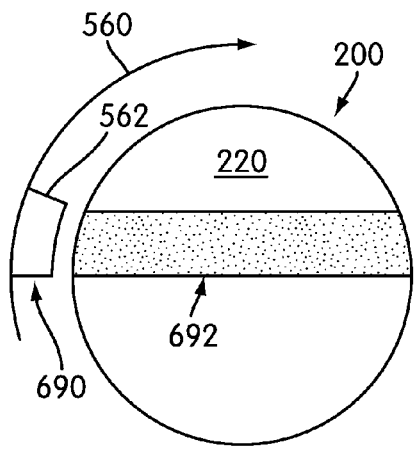
FIG. 6 is a detailed view showing one embodiment of a first abrasive head connected to an adjustment structure in a first desired position.

FIGS. 6-9 show in simplified form how a single abrasive may be positioned at four different desired positions to remove burrs in four different areas of a ball 200. FIG. 6 shows abrasive 562 connected to arm 560 and positioned in first desired position 690. When abrasive 562 is moved adjacent ball 200 and ball 200 is rotated, the abrasion pattern on outer surface 220 of ball 200 will generally be first abrasion pattern 692.

Figure 7:
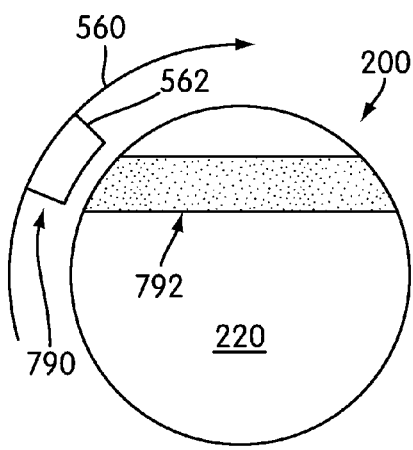
FIG. 7 is a detailed view showing the abrasive head of FIG. 6 in a second desired position.

Arm 560 or abrasive 562 or both may then be moved to a second desired position. FIG. 7 shows abrasive 562 connected to arm 560 and positioned in second desired position 790. When abrasive 562 is moved adjacent ball 200 and ball 200 is rotated, the abrasion pattern on outer surface 220 of ball 200 will generally be second abrasion pattern 792.

Figure 8:
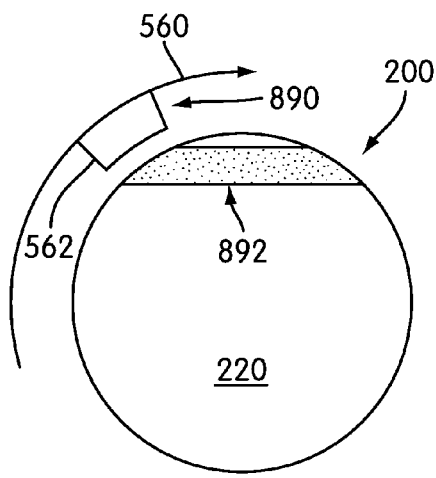
FIG. 8 is a detailed view showing the abrasive head of FIG. 6 in a third desired position.

Arm 560 or abrasive 562 or both may then be moved to a third desired position. FIG. 8 shows abrasive 562 connected to arm 560 and positioned in third desired position 890. When abrasive 562 is moved adjacent ball 200 and ball 200 is rotated, the abrasion pattern on outer surface 220 of ball 200 will generally be third abrasion pattern 892.

Figure 9:
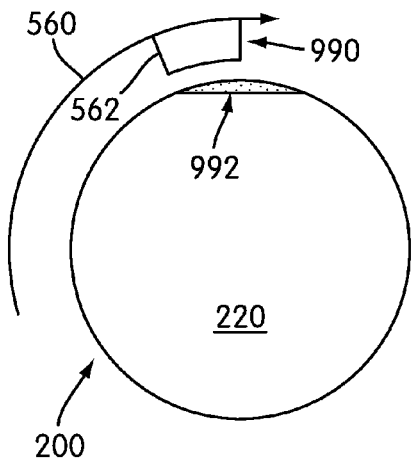
FIG. 9 is a detailed view showing the abrasive head of FIG. 6 in a fourth desired position.

Arm 560 or abrasive 562 or both may then be moved to a fourth desired position. FIG. 9 shows abrasive 562 connected to arm 560 and positioned in fourth desired position 990. When abrasive 562 is moved adjacent ball 200 and ball 200 is rotated, the abrasion pattern on outer surface 220 of ball 200 will generally be fourth abrasion pattern 992.

Controller 307 may position abrasive 562 in any of a variety of arcs and lengths and distances depending on the positions of the burrs 201 that remain on ball 200. Controller 307 may position abrasive 562 in discrete areas or overlapping areas as may be deemed desirable based on choice or design limitations. Controller 307 may calculate a necessary path for abrasive 562 for each burr 201 individually and then correlate the calculations to perform as few placements of abrasive as possible to remove any remaining burrs. As shown in FIG. 4, it may be possible in some embodiments for an abrasive to remove multiple burrs in a single appropriate position. Because the abrasive also abrades outer surface 220 of ball 200 on each rotation, it may be desirable to minimize the number of desired positions used per ball. Accordingly, the four desired positions, 692, 792, 892, 992 may only be appropriate when required by the position of burrs 201.

Figure 10:
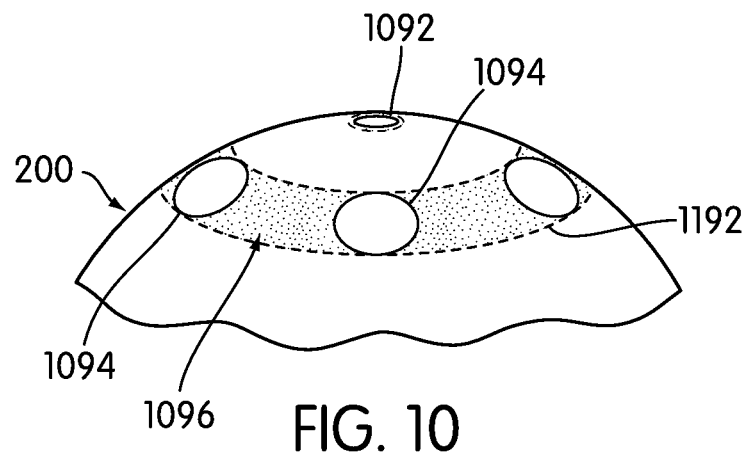
FIG. 10 is a side view of a ball showing an exemplary abrasion pattern when one of the embodiments disclosed herein is used.
Figure 11:
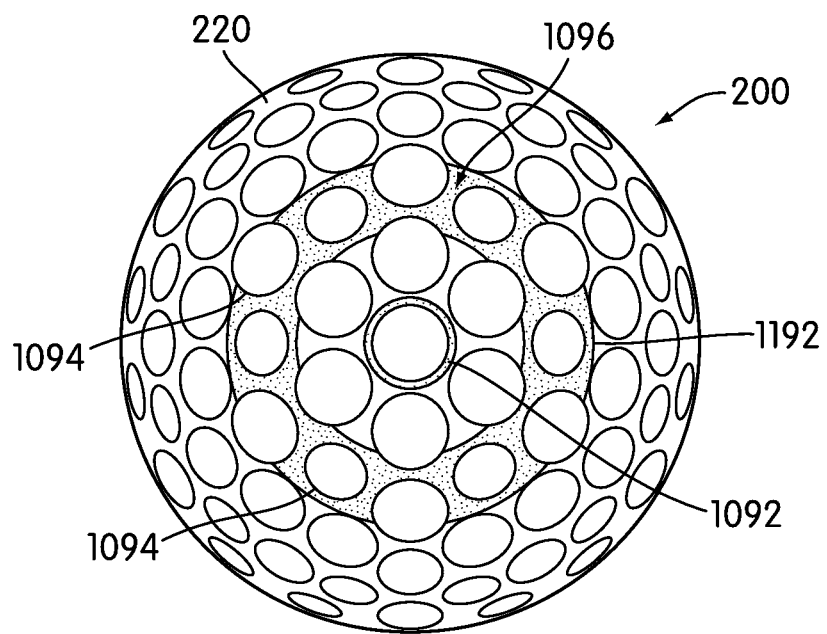
FIG. 11 is a top view of the ball of FIG. 10.

Turning now to FIGS. 10 and 11, more detailed views of abrasion patterns are shown. FIG. 11 is a top view of ball 200 showing an exemplary dimple pattern on its outer surface 220. Ball 200 shows first exemplary abrasion pattern 1092 and second exemplary abrasion pattern 1192. A similar view in perspective and slightly simplified is shown in FIG. 10. Exemplary abrasion pattern 1092 may be made by placement of an abrasive (not shown in this FIG.) in a desired position similar to fourth position 990 of FIG. 9. Exemplary abrasion pattern 1192 may be made by placement of an abrasive in a desired pattern similar to third position 890 of FIG. 8. In many embodiments, as shown in FIGS. 10 and 11, the abrasive may not enter the dimples or recesses 1094, but instead will remain on the land area 1096 surrounding dimples 1094. In other embodiments, the abrasive may be designed to be sized and shaped and provided with a spring force to be capable of entering some or all of dimples 1094 and abrading the interior surface of dimples 1094.

Figure 12:
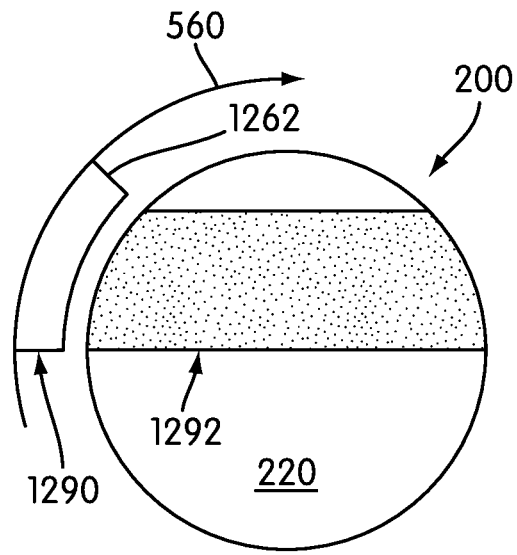
FIG. 12 is a detailed view of an alternative embodiment of an abrasive head connected to an adjustment structure.

Turning now to FIG. 12, another simplified view of a single abrasive positioned at a desired position on ball 200. In some embodiments, the burrs on a ball 200 may be placed irregularly. In such an instance, it may not be desirable to use an abrasive in a series of positions. For example, using an abrasive in a series of positions may result in an overlap between abrasion patterns. If there is too great an overlap, a second abrasion over the same portion of outer surface 220 may create too deep an abrasion as described in connection with FIG. 5 above. In such an embodiment, it may be desirable instead to incorporate a larger abrasive 1262 in designated position 1290 that creates a larger abrasive pattern 1292.

It will be apparent to one having ordinary skill in the art that the abrasive used may have a variety of configurations. The abrasive may have varying sizes including lengths and thicknesses depending on its qualities. Different abrasives may have limitations on how thin or thick a piece may be used before breakage becomes likely. For example, if pumice is used, because of its brittleness, too thin a piece may break upon contacting a large burr, rather than effectively abrading and removing it. However, a diamond sandpaper on a steel plate may be effective at a similar thickness. These characteristics are well known to persons having ordinary skill in the art. These data may also be input into the controller and the controller may be capable of indicating to the operator which abrasive and what size should be used for each ball, particularly if sensor data is used to generate an abrasive pattern. In some embodiments, the controller may be capable of actuating a device that can place the desired size of abrasive on the arm. In one exemplary embodiment, if sandpaper is used, the controller may be capable of expanding apart two plates connected to the arm to change the effective width of the sandpaper that touches the ball. Other automated embodiments are also known in the art and easily may be used in the present disclosure.

Figure 13:
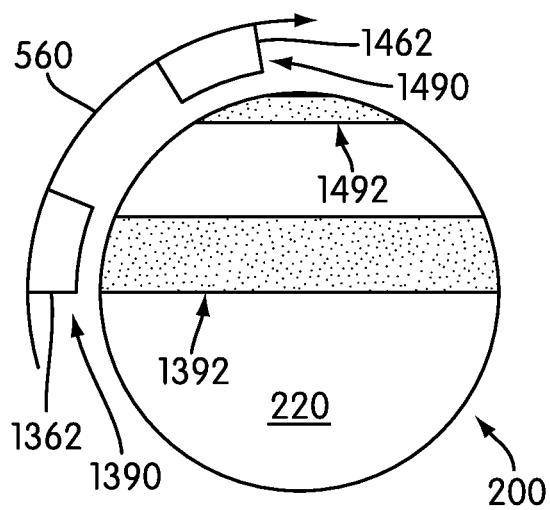
FIG. 13 is a detailed view showing the use of first and second abrasives connected to an adjustment structure.

Turning now to FIG. 13, it may be desirable to use multiple abrasives simultaneously. In the embodiment of FIG. 13, first abrasive 1362 is connected to arm 560 and positioned in first appropriate position 1390. Second abrasive 1462 is connected to arm 560 and positioned in second appropriate position 1490. First abrasive 1362 and second abrasive 1462 contact outer surface 220 of ball 200 substantially simultaneously and generate abrasive patterns substantially simultaneously. First abrasive 1362 generates first abrasive pattern 1392 and second abrasive 1462 generates second abrasive pattern 1492. While in FIG. 13, first abrasive 1362 and second abrasive 1462 are shown as being connected to the same arm 560, it is also possible to have each of first abrasive 1362 and second abrasive 1462 connected to two different attachment structures independently controllable by the controller (not shown in this FIG.). Indeed, in some embodiments, more than two abrasives may be used and positioned on the same or independent arms.

FIGS. 6-9, 12, and 13 all show simplified versions of an abrasive, arm, and ball. It will be apparent to one having ordinary skill in the art that while the detailed exemplary features of FIGS. 3 and 4 are not specifically shown in any of FIGS. 6-9, 12, and 13, any or all of these features are understood to be included in FIGS. 6-9, 12, and 13. In addition, while the detailed processes and methods described in connection with FIGS. 3 and 4 are not repeated in the discussions of the remaining FIGS, it is to be understood that any or all of these detailed processes and methods may be used in connection with the simplified versions. The simplified illustrations are simplified for ease of understanding of a person having ordinary skill the art.

Figure 14:
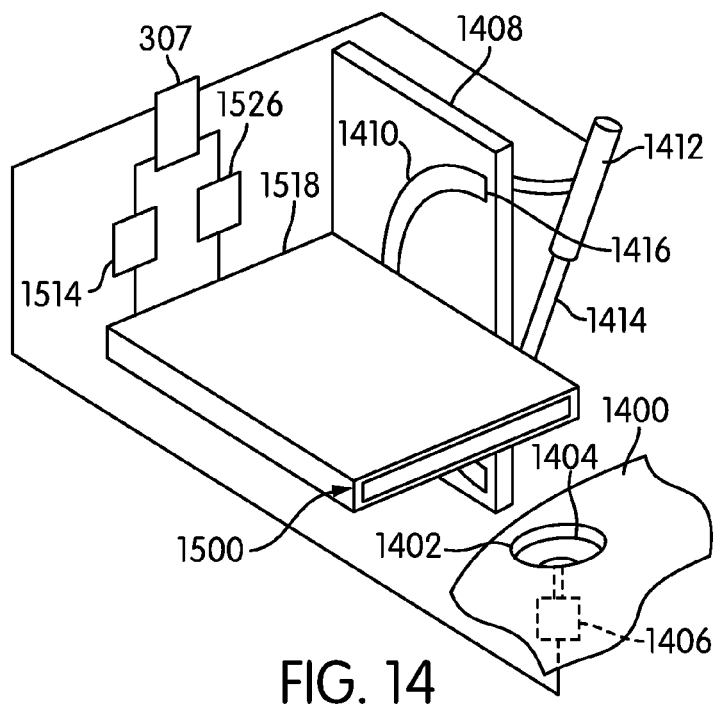
FIG. 14 is a perspective view of an alternative structure for positioning an abrasive.

In addition to these modifications, alternative structures may be used in the method described herein. FIG. 14 shows an alternative embodiment. As shown in FIG. 14, a ball holder plate 1400 may include a ball holder recess 1402. Ball holder recess 1402 may be configured to be shaped and sized to retain a ball (not shown) therein. Ball holder recess 1402 may further include a strip 1404 of rubber, adhesive, or other friction-enhancing material for retaining the ball in ball holder recess 1402. Ball holder plate 1400 may be circular and may include a plurality of ball holder recesses 1402. Each ball holder recess 1402 may be rotated by rotator 1406. Rotator 1406 may be any structure capable of rotating ball holder recess 1402. Rotator 1406 may be manually actuated or may be connected to electronic control unit 307.

Figure 15:
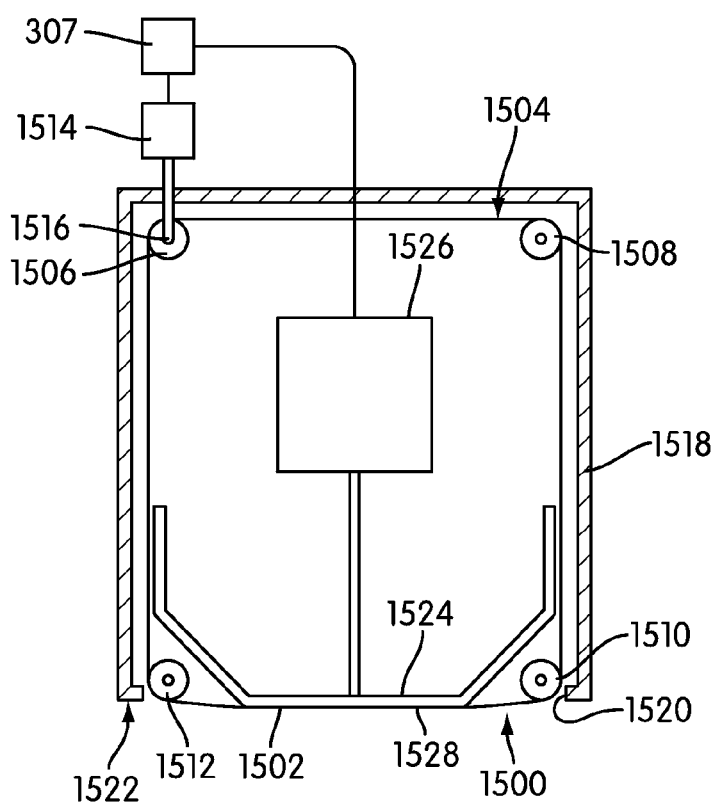
FIG. 15 is a top view, partially in section, of a structure for moving an abrasive.

Placed adjacent ball holder recess 1402 is a first abrasive 1500, which is shown more clearly in FIG. 15. First abrasive 1500 may have a number of components. First abrasive 1000 may include a first abrasive surface 1502. First abrasive surface 1502 may, in some embodiments, be formed of a sheet-like abrasive. In some embodiments, first abrasive surface 1502 may be a sheet of sandpaper. First abrasive surface 1502 may be a continuous loop 1504 of abrasive. Continuous loop 1504 may be of sufficient length to extend around a series of rotatable pulleys. In the embodiment shown in FIG. 15, the rotatable pulleys include first rotatable pulley 1506, second rotatable pulley 1508, third rotatable pulley 1510, and fourth rotatable pulley 1512. While four rotatable pulleys are shown, another number of rotatable pulleys may be deemed desirable by a person having ordinary skill in the art. The use of four rotatable pulleys in FIG. 15 is merely exemplary. In some embodiments, one of the rotatable pulleys may be a drive pulley and the remaining pulleys may simply rotate about an axis. In other embodiments, each pulley may be a drive pulley.

In FIG. 15, first rotatable pulley 1506 may be a drive pulley driven by a drive motor 1514 or other conventional structure for rotating pulley 1506. Drive motor 1514 may be manually actuated or control of drive motor 1514 may be controlled by electronic controller 307.

A case 1518 may surround much of the pulley and loop structure. In many embodiments, case 1518 may include at least one aperture 1520 along one side 1522. A purpose for aperture 1520 may be to allow loop 1504 to project outwardly from case 1518. As shown in FIG. 15, a reciprocating finger 1524 may be reciprocally positioned within case 1518. Reciprocating finger 1024 may be coupled to a reciprocating drive 1526. Reciprocating drive 1526 may be any system that is capable of moving reciprocating finger 1524 in and out of case 1518 through aperture 1520. Reciprocating drive 1026 may be manually actuated or may be further connected to electronic controller 307, which may control its motion.

When reciprocating finger 1524 moves outwardly from case 1518 (shown as downwardly in FIG. 15), it engages loop 1504. The outward movement of reciprocating finger 1524 causes the tightening of loop 1504 around first pulley 1506, second pulley 1508, third pulley 1510, and fourth pulley 1512. When first drive pulley 1506 is engaged, loop 1504 may rotate around first pulley 1506, second pulley 1508, third pulley 1510, and fourth pulley 1512 and against engaging surface 1528 of reciprocating finger 1524. Engaging surface 1528 may be any desired size and shape, and the size and shape of engaging surface 1528 shown in FIG. 15 is merely exemplary.

Abrasive 1500 is positioned relative to ball holder recess 1402 by moving case 1518. Case 1518 may be moved by use of a cam surface on case 1518 and a cam surface on tower 1408. As shown in FIG. 14, tower 1408 includes a C-shaped channel or projection 1410. This C-shaped cam surface 1410 mates with a corresponding cam surface on case 1518. When case 1518 is moved, it changes angular position relative to ball holder recess 1402 by following C-shaped cam surface 1410 on tower 1408. The position of case 1518 may be governed by hydraulic positioner 1412. Hydraulic positioner 1412 may be secured to tower 1408 and case 1518. Hydraulic positioner 1412 may be controlled manually or may be connected to electronic controller 307. The effective length of hydraulic positioner lower arm 1414 may be controlled by a hydraulic pump in a known manner. Hydraulic positioner 1412 may instead be a mechanical positioner of any sort known by a person having ordinary skill in the art.

Controller 307 may be used in the same manner described above to position abrasive 1500 in a desired position relative to a ball in ball holder recess 1402. Controller 307 may use positioner 1412 to move case 1518 to change its effective angular position and the effective length or distance from one end 1416 of cam surface 1410 on tower 1408. Controller 307 may also use reciprocating finger 1524 to extend abrasive 1500 towards a ball in ball holder recess 1402. In this way, the embodiment shown in FIGS. 14 and 15 may be used in the same manner and in the same methods as disclosed above.

The FIGS. and description in the present embodiments refer generally to golf balls. It will be apparent to one having ordinary skill in the art that the presently disclosed methods may be used on other types of balls or other structures. The present methods are not limited to balls. Accordingly, where the term ball is used in the specification and claims for ease of understanding the detailed embodiments illustrated, it will be understood that whatever the item to be deburred is may be substituted therein for a ball.

While various embodiments of the invention have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

What is claimed is:

1. A method of deburring a ball, comprising:
providing a first abrasive formed of a material capable of abrading a burr and removing the burr from an outer surface of a ball, the first abrasive being attached to and capable of reciprocating relative to both an arm and the ball along a first degree of freedom and the first abrasive being capable of moving along the length of the arm along a second degree of freedom;
connecting the first abrasive to an adjustment structure capable of controlling the relative position of the first abrasive and the ball by moving the first abrasive along both the first degree of freedom and the second degree of freedom;
calculating a deburring position of the first abrasive and determining an appropriate arc of the arm; and
moving the first abrasive along at least one of the first degree of freedom and the second degree of freedom to the deburring position.

2. The method of deburring a ball according to claim 1, further comprising the step of calculating an appropriate length of time for the first abrasive to be in the deburring position.

3. The method of deburring a ball according to claim 1, further comprising providing a ball holder.

4. The method of deburring a ball according to claim 3, wherein the ball holder is rotatable and further comprising calculating an appropriate length of time for the ball holder to rotate.

5. The method of deburring a ball according to claim 4, further comprising placing a ball having burrs in the ball holder and rotating the ball holder.

6. The method of deburring a ball according to claim 3, further comprising moving the arm from a first position to a second position, thereby moving the first abrasive.

7. The method of deburring a ball according to claim 1, further comprising providing a second abrasive and connecting the second abrasive to the adjustment structure.

8. The method of deburring the ball according to claim 1, wherein the first degree of freedom is a direction perpendicular to the length of the arm the calculating step comprises determining an appropriate arc of the arm.

9. The method of deburring the ball according to claim 1, wherein the calculating step further comprises determining the deburring position of an abrasive surface of the first abrasive.

10. The method of deburring the ball according to claim 9, wherein the moving step comprises moving a first portion of the adjustment structure along the first degree of freedom to position the first abrasive according to the arc calculation step and moving a second portion of the adjustment structure along the second degree of freedom to position the abrasive surface of the first abrasive according to the abrasive surface position calculation step.

11. A method of deburring a ball, comprising:
providing a first abrasive surface attached to and capable of reciprocating relative to both an arm and a ball along a first degree of freedom, the first abrasive surface being capable of moving along the length of the arm along a second degree of freedom;
providing a programmable logic circuit capable of calculating a first deburring position of the first abrasive surface;
providing a second abrasive surface attached to and capable of reciprocating relative to the arm;
connecting an adjustment structure to both the programmable logic circuit and the first abrasive surface, the adjustment structure being capable of moving the first abrasive surface along both the first degree of freedom and the second degree of freedom into the first deburring position;
calculating the first deburring position; and
moving the first abrasive surface along at least one of the first degree of freedom and the second degree of freedom into the first deburring position.

12. The method of deburring a ball according to claim 11, wherein the programmable logic circuit is capable of calculating a desired length of time the first abrasive surface is to be placed in the first deburring position and the method further comprises placing the first abrasive surface in the first deburring position for the desired length of time.

13. The method of deburring a ball according to claim 11, further comprising connecting a rotatable ball holder to the programmable logic circuit.

14. The method of deburring a ball according to claim 13, wherein the programmable logic circuit is capable of calculating a desired length and speed of rotation of the rotatable ball holder and the method further comprises calculating a desired length and speed of rotation of the rotatable ball holder.

15. The method of deburring the ball according to claim 14, further comprising rotating the rotatable ball holder for the desired length of time at the desired speed.

16. The method of deburring a ball according to claim 15, further comprising placing a ball in the rotatable ball holder.

17. The method of deburring a ball according to claim 11, wherein the second abrasive surface is capable of moving along the length of the arm along a second degree of freedom.

18. The method of deburring a ball according to claim 17, further comprising calculating a second deburring position for the second abrasive surface.

19. The method of deburring a ball according to claim 18, further comprising moving the second abrasive surface along at least one of the first degree of freedom and the second degree of freedom into the second deburring position substantially simultaneously with moving the first abrasive surface along at least one of the first degree of freedom and the second degree of freedom into the first deburring position.

20. The method of deburring a ball according to claim 16, further comprising sensing a position, shape, and size of a burr on the ball.

* * * * *